United States Patent [19]

Okuda

[11] Patent Number: 5,573,578
[45] Date of Patent: Nov. 12, 1996

[54] STENCIL PRINTING EMULSION INK

[75] Inventor: Sadanao Okuda, Tokyo, Japan

[73] Assignee: Riso Kagaku Corporation, Tokyo, Japan

[21] Appl. No.: 533,098

[22] Filed: Sep. 25, 1995

[30] Foreign Application Priority Data

Sep. 29, 1994 [JP] Japan .................. 6-235524

[51] Int. Cl.⁶ .................................. C09D 11/02
[52] U.S. Cl. .................. 106/20 R; 106/27 R; 106/30 R; 106/32
[58] Field of Search ............... 106/20 R, 27 R, 106/30 R, 32

[56] References Cited

U.S. PATENT DOCUMENTS

| | | | |
|---|---|---|---|
| 5,378,739 | 1/1995 | Koike et al. | 106/25 R |
| 5,389,130 | 2/1995 | Batlaw et al. | 106/20 R |
| 5,395,435 | 3/1995 | Mizobuchi | 106/27 R |

FOREIGN PATENT DOCUMENTS 255967  11/1986  Japan .

*Primary Examiner*—Helene Klemanski
*Attorney, Agent, or Firm*—Fay, Sharpe, Beall, Fagan, Minnich & McKee

[57] ABSTRACT

A stencil printing emulsion ink of a water-in-oil type is disclosed which contains in an oil phase 1 to 50% by weight, based on the weight of a water phase, of a volatile solvent having a distillation starting temperature of 275° C. or higher and having a viscosity of 10 mm²/s·40° C. or less, and has a weight ratio of the oil phase/water phase of 20 to 50/80 to 50.

4 Claims, No Drawings

STENCIL PRINTING EMULSION INK

BACKGROUND OF THE INVENTION

1. Field of the Invention

The present invention relates to a stencil printing emulsion ink. More particularly, the present invention relates to a stencil printing emulsion ink of a water-in-oil type which is small in viscosity change when left in the air for a long period of time, and low in an offensive smell and toxic character.

2. Description of the Prior Art

Stencil printing is a method of printing wherein a stencil printing master sheet is perforated and ink is forced to pass through the perforations which were formed in the stencil printing master sheet to print such a body to be printed as a paper.

Heretofore, a water-in-oil type emulsion ink has been used for stencil printing ink, and a volatile solvent, non-volatile solvent, resin, colorant, and surfactant are contained in an oil phase of the water-in-oil type emulsion ink, and an electrolyte, antifreezing agent, and preservative are contained in a water phase of the emulsion ink.

When such a ink is left in the air for a long period of time, volatile components are dispersed from the oil phase and water is dispersed from the water phase. Whereas the amount of the volatile components which are dispersed from the oil phase is decided by the temperature of the emulsion ink, the amount of water which is dispersed from the water phase is decided by the absolute humidity of surroundings. Accordingly, the amount of the volatile solvent and water dispersed from the oil phase and water phase is different depending on the temperature and the absolute humidity. Thus, it was very difficult to obtain an emulsion ink having excellent stability when it was left in the air for a long period of time.

In order to solve the problem, several methods have been proposed wherein the range of boiling point or initial boiling point at distillation of a volatile solvent used for a water-in-oil type emulsion ink is restricted. For instance, in Unexamined Japanese patent publication No. 61-255967, the boiling point of the volatile solvent to be used is restricted in the range of 180° to 270° C. In Unexamined Japanese patent publication No. 5-125320, the initial boiling point at distillation is restricted in the range of 150° to 210° C. Much amount of the volatile solvents used in these methods are dispersed in the air at a temperature of 0° to 40° C., at which stencil printing is carried out, and the amount of water dispersed is increased with the increase of the amount of dispersion of the volatile solvent. Thus the emulsion ink after the dispersion of the volatile solvent and water exhibits, due to the change in the composition of ink accompanied with the dispersion, a behavior similar to the ink comprising an oil phase only, and the ink after the dispersion is liable to cause offset. Also, the content of a pigment in the oil phase in the ink increases, and thus the trend of print concentration to increase up to higher than the print concentration in the case wherein an emulsion ink was not left for a long period of time before its use is noticed. Particularly, when the initial boiling point at distillation is selected to be in the range of 150° to 210° C., the amount of dispersed volatile solvent is increased and a large amount of water is dispersed accompanied with the dispersion of solvent, leading to a remarkable change in the appearance of the print.

Further, when a stencil printing emulsion ink was prepared using a non-volatile solvent without using a volatile solvent in order not to clog perforations in a perforated stencil printing sheet when the ink is left in the printing sheet, only water in the emulsion ink is dispersed to decrease the viscosity of the ink, and thus the bleeding (or blotting) of printed picture images and offset of the ink due to the increase of the amount of ink to be transferred become easy to occur.

Since stencil printing is easy to perform so that the printing has been used in a wide range of applications including office works, it is necessary to suppress an offensive smell of stencil printing ink.

SUMMARY OF THE INVENTION

An object of the present invention is to solve the problem in the prior art mentioned above and to provide a stencil printing emulsion ink with which the dispersion of a volatile solvent in the ink component when the ink was left in the air is suppressed; the increase in the print concentration, offset, and bleeding of the ink are decreased; and an offensive smell, toxicity, and skin stimulation with the solvent are removed.

The present invention is concerned with a stencil printing emulsion ink of a water-in-oil type containing in an oil phase 1 to 50% by weight, based on the weight of a water phase, of a volatile solvent having a distillation starting temperature of 275° C. or higher and having a viscosity of 10 mm$^2$/s·40° C. or less, and having a weight ratio of the oil phase/water phase of 20 to 50/80 to 50.

DETAILED DESCRIPTION OF THE PREFERRED EMBODIMENTS

The content of an aromatic component in the volatile solvent is preferably 1% by weight or less.

The stencil printing emulsion ink of the present invention has preferably a viscosity of 27 to 38 mm in terms of spread-o-meter value (diameter after 1 minute) at 25° C.

The water-in-oil type emulsion ink of the present invention can be prepared by gradually adding 80 to 50% by weight of a water phase to 20 to 50% by weight of an oil phase to form an emulsion. In the oil phase, a volatile solvent, non-volatile solvent, and emulsifier are contained. A resin is also contained in the oil phase when necessary. In the water phase, water-soluble additives such as a wetting agent, water-soluble resin, electrolyte, mildew-proofing agent, anti-oxidant, and anti-freezing agent can be added when necessary. A colorant can be added in an oil phase and/or water phase.

In the present invention, a volatile solvent having a distillation starting temperature of 275° C. or higher, preferably in the range of 275° to 310° C., and having a viscosity of 10 mm$^2$/s·40° C. or less, preferably in the range of 0.1 to 6 mm$^2$/s·40° C. is contained in a ratio of 1 to 50% by weight, preferably in the ratio of 3 to 20% by weight, based on the weight of the water phase.

When the distillation starting temperature is lower than 275° C., the amount of dispersion of the volatile solvent at a temperature of lower than 40° C. is increased and the dispersion of water from the water phase accompanied with the dispersion of the volatile solvent is increased. Thus, the ink after the dispersion of the volatile solvent and water becomes to have a character similar to that of the ink comprising only an oil phase containing a non-volatile solvent, and much of the offset occurs. In the present invention, since the dispersion of the volatile solvent can be decreased and the dispersion of water accompanied with the dispersion of the volatile solvent can be suppressed to the utmost by selecting a volatile solvent having a distillation starting temperature of 275° C. or higher, as the solvent, the change in the composition of an emulsion ink when it is left in the air for a long period of time can be decreased. The reason why the control of the dispersion of a volatile solvent at a temperature lower than 40° C. is necessary is that the stencil printing is actually conducted in an environment at a temperature of lower than 40° C.

When the viscosity of the volatile solvent exceeds 10 $mm^2/s \cdot 40°$ C., the viscosity of the emulsion ink prepared from the solvent becomes high, the fluidity of the ink becomes worse, and thus the emulsion ink becomes unsuitable for stencil printing.

When the amount of the volatile solvent to be blended is less than 1% by weight based on the weight of water phase, the viscosity of the emulsion ink to be obtained becomes high, the fluidity of the ink becomes worse, the decrease in the viscosity of the ink when it was left is remarkable, and the bleeding of printed picture images and offset of the ink, due to the increase of the amount of the ink transferred, become easy to occur. On the other hand, when the amount of the volatile solvent to be blended exceeds 50% by weight, the viscosity of the oil phase decreases, viscosity of the emulsion ink to be obtained becomes too low and the amount of the ink transferred is increased. As the result, it becomes a cause of a high print concentration, the development of the offset and bleeding.

The volatile solvent which is used in the present invention, and has a distillation starting temperature of 275° C. or higher and a viscosity of 10 $mm^2/s \cdot 40°$ C. or less includes, for example, the followings:

Product of Exxon Chemical Japan Ltd.:

Trade name: EXXSOL-D130: Distillation starting temperature: 277° C.; viscosity: 3.8 $mm^2/s \cdot 40°$ C.

Products of NIPPON OIL COMPANY LTD.:

Trade name: Teclean N-28: Distillation starting temperature: 277° C.; viscosity: 4.2 $mm^2/s \cdot 40°$ C.

Trade name: Teclean N-30: Distillation starting temperature: 296° C.; viscosity: 5.5 $mm^2/s \cdot 40°$ C.

Trade name: Teclean N-32: Distillation starting temperature: 317° C.; viscosity: 7.5 $mm^2/s \cdot 40°$ C.

Trade name: Teclean N-33: Distillation starting temperature: 325° C.; viscosity: 10.0 $mm^2/s \cdot 40°$ C.

Trade name: AF-5: Distillation starting temperature: 279° C.; viscosity: 4.2 $mm^2/s \cdot 40°$ C.

Trade name: AF-6: Distillation starting temperature: 301° C.; viscosity: 5.6 $mm^2/s \cdot 40°$ C.

In the present invention, the content of an aromatic component in the volatile solvent is preferably adjusted to 1% by weight or less. When the content of the aromatic component in the volatile solvent exceeds 1% by weight, the solvent may emit an offensive smell peculiar to an aromatic component, and thus its content is preferably as small as possible.

The viscosity of the emulsion ink in the present invention is preferably adjusted in the range of 27 to 38 mm, more desirably 29 to 35 mm in terms of spread-o-meter value (diameter after 1 minute) at 25° C. When the spread-o-meter value is less than 27 mm, the fluidity of the ink is inferior, the amount of the ink to be transferred when stencil printing is conducted becomes small, and the print concentration of printed materials is decreased in some cases. Conversely, when the value exceeds 38 mm, the viscosity of the ink is excessively low, the amount of the ink transferred is increased, and the print concentration of printed materials is excessively high, causing the offset and bleeding under the circumstances.

As the non-volatile solvent in the oil phase, an oil can be used such as an olive oil, castor oil, spindle oil, motor oil, and salad oil.

As an emulsifier, a nonionic surfactant can preferably be used which includes a sorbitan higher fatty acid ester (for example, sorbitan monolaurate, sorbitan monopalmitate, sorbitan monostearate, sorbitan tristearate, sorbitan monooleate, and sorbitan sesquioleate), fatty acid monoglyceride (for example, oleic acid monoglyceride, and oleic acid diglyceride), and ethylene oxide adduct with a polyhydric alcohol, alkyl phenol, or fatty acid.

When a colorant is contained in the oil phase, a resin is preferably contained also in the oil phase in order to secure the fixing of the ink to paper. The resin includes a phenolic resin, maleic resin, petroleum resin, and alkyd resin. On the other hand, when a colorant is contained in the water phase, a resin is also contained in the water phase by the same reason as in the case where a colorant is contained in the oil phase.

As the resin, a water-dispersible resin and water-soluble resin can be mentioned. The water-dispersible resin includes a polyvinyl acetate, ethylene-vinyl acetate copolymer, vinyl acetate-acrylic ester copolymer, polymethacrylic ester, polystyrene, styrene-acrylic ester copolymer, styrene-butadiene copolymer, vinylidene chloride-acrylic acid ester copolymer, polyvinyl chloride, vinyl chloride-vinylacetate copolymer, and polyurethane. The water-soluble resin includes a polyvinyl alcohol, methyl cellulose, carboxymethyl cellulose, hydroxymethyl cellulose, polyvinyl pyrrolidone, ethylene-vinyl alcohol copolymer, polyethylene oxide, gum arabic, starch, and water-soluble polyurethane.

In the present invention, a colorant can be contained in the oil phase and/or water phase. The colorant includes carbon blacks such as furnace carbon black, lamp black, and brilliant first scarlet, metals such as copper, iron, titanium oxide, and calcium carbonate, metal oxides, organic pigments such as an azo, cyanine, dioxane, and quinacridone pigment.

Whereas a wetting agent, which can change the dispersion rate of water from the water phase can be added in the water phase at need, the amount of the wetting agent to be added is preferably decided depending suitably on the dispersion rate of a volatile agent used in the present invention. The wetting agent includes polyhydric alcohols, for example, ethylene glycol, propylene glycol, diethylene glycol, and glycerine.

The stencil printing emulsion ink of the present invention can suppress the dispersion of water accompanied with the dispersion of the volatile solvent since the dispersion of the volatile solvent when the emulsion ink was left in the air is small. Thus, according to the present invention, a stencil printing emulsion ink can be provided which is small in the change of ink performances when the emulsion ink was left for a long period of time and thus excellent in stability of the ink.

Further, according to the present invention, a stencil printing water-in-oil type emulsion ink can be provided with which the change in the print concentration, offset, bleeding, and paper loss can be decreased when the ink was left for a long period of time, because the dispersion of the volatile solvent is small and the change in the composition of emulsion ink is small even when the emulsion ink was left in a stencil printing machine for a long period of time. Still further, a stencil printing emulsion ink having a low offensive smell and low toxicity can be provided by the present invention. Still further, the present invention can provide an ink having an excellent printability for stencil printing.

Now, the present invention will be described in more detail with reference to Examples and Comparative Examples. However, it should be understood that the present invention is by no means restricted by such specific Examples. In the Examples, "parts" means "partsby weight" unless specified otherwise.

Trade names, distillation starting temperatures, viscosities, and contents of aromatic components of the volatile solvents used in Examples 1 to 5 and Comparative Examples 1 to 3, 5, and 6 are given in Table 1.

TABLE 1

|  | Trade name of volatile solvent | Distillation starting temperature (°C.) | Viscosity (mm$^2$/s/40° C.) | Content of aromatic component (% by weight) |
| --- | --- | --- | --- | --- |
| Example 1 | EXXSOL-D130 | 277 | 3.8 | 0.8 |
| Example 2 | AF-5 | 279 | 4.2 | less than 1.0 |
| Example 3 | Teclean N-30 | 296 | 5.5 | less than 1.0 |
| Example 4 | AF-6 | 301 | 5.6 | less than 1.0 |
| Example 5 | EXXSOL-D130 | 277 | 3.8 | 0.8 |
| Comparative Example 1 | EXXSOL-D80 *1 | 204 | 1.7 | 0.01 |
| Comparative Example 2 | Solvent No. 4 *2 | 235 | 2.7 | 18.0 |
| Comparative Example 3 | Ink oil No. 11 *3 | 276 | 18.0 | 16.0 |
| Comparative Example 5 | AF-6 | 301 | 5.6 | less than 1.0 |
| Comparative Example 6 | EXXSOL-D80 | 204 | 1.7 | 0.01 |

*1: Product of Exxon Chemical Japan Ltd.
*2: Product of NIPPON OIL COMPANY LTD.
*3: Product of NIPPON OIL COMPANY LTD.

EXAMPLES 1 to 4 AND COMPARATIVE EXAMPLES 1 to 5

Nine kinds of emulsion ink were prepared by the following procedures using the formulation as shown in Table 2:

First, an alkyd resin, furnace carbon black, sorbitan monocleate, motor oil No. 40, and one of the volatile solvents as shown in Table 1 were added to each other. Then, they were sufficiently mixed, sufficiently kneaded with three rollers, and stirred with a stirrer while gradually being added with an aqueous solution comprising water and ethylene glycol to prepare respective water-in-oil type emulsion ink.

EXAMPLES 5 AND COMPARATIVE EXAMPLES 6

Two kinds of emulsion ink were prepared by the following procedures using the formulation as shown in Table 2:

First, deionized water, ethylene glycol, furnace carbon black, and polyvinyl pyrrolidone (produced by BASF; Trade name: Luviskol K17) were added to each other, sufficiently mixed, and dispersed with a ball mill to prepare a water phase. On the other hand, motor oil No. 40, sorbitan monocleate, and one of the volatile solvents shown in Table 1 were added to each other and sufficiently stirred to prepare an oil phase. Then, the oil phase was stirred with a stirrer while being gradually added with the water phase prepared by the procedures mentioned above to prepare respective water-in oil type emulsion ink.

[Test methods for the emulsion ink]

By using each of the water-in-oil type stencil printing emulsion ink which was obtained in Examples 1 to 5 and Comparative Examples 1 to 6, printing tests were carried out by means of a stencil printing machine, Riscgraph RC115D (Registered trademark; product of Risc Kagaku Corporation) before or after each of the emulsion ink was left in such a high temperature and high humidity atmosphere as 35° C. and 70% RH for 120 hours, and the results thus obtained are shown in Table 3.

Printing tests were conducted to determine or evaluate the print concentration of printed matters; offset property, bleeding property, and offensive smell of the ink; and number of paper sheets printed until an ordinary print concentration was obtained (number of waste paper sheets) by the methods mentioned below. Determination of the viscosity of the emulsion ink with a spread-o-meter was conducted in an environment of 25° C.

(1) Print concentration: The print concentration at the set-solid portions of printed matters was determined by a Macbeth reflection densitometer (RD-920 produced by Macbeth Co.).

(2) Offset property: Printing was continuously conducted for 30 paper sheets by using a manuscript having many set-solid portions, and the emulsion ink which exhibited no offset was graded as o (circle), but the ink which exhibited offset were graded as × (crossing mark).

(3) Bleeding property: Printing was conducted by using a manuscript having many characters in slender writing. The bleeding condition was observed by using a microscope at a magnification of ×100. In the case when the bleeding on printed matters was little, the evaluation of the ink was indicated by the sign of o (circle), but the sign of × (crossing mark) was given for the case where much bleeding was observed.

(4) Offensive smell: When printed matters were found, with a sense of nose, to be emitting no smell, the ink was graded as o (circle), but when the printed matters were emitting a smell, the ink was graded as × (crossing mark).

(5) Number of lost paper sheets: After each of the emulsion ink was left in an environment of such a high temperature and high humidity as 35° C. and 70% RH for 120 hours, printing was conducted by using a perforated stencil printing sheet. The number of waste paper sheets used by the time when the same print concentration as the case when the ink to be used had not been left was counted, and it was regarded as the number of lost paper sheets.

As will be understood from the results shown in Table 3 below, the water-in-oil type emulsion ink of the present invention is excellent in printing performances either before and after it was left for a long period of time in the air.

TABLE 2

| Composition of W/O type emulsion ink | | Example | | | | |
|---|---|---|---|---|---|---|
| (parts by weight) | | 1 | 2 | 3 | 4 | 5 |
| Oil phase | | | | | | |
| Volatile solvent | (refer to Table 1) | 6.0 | 7.0 | 10.0 | 5.0 | 9.0 |
| Non-volatile solvent | Motor oil No. 40 | 11.0 | 10.0 | 12.0 | 7.0 | 15.0 |
| Emulsifier | Sorbitan monooleate | 2.0 | 2.0 | 2.0 | 2.0 | 2.0 |
| Resin | Alkyd resin | 7.0 | 7.0 | 7.0 | 7.0 | — |
| Colorant | Furnace carbon black | 4.0 | 4.0 | 4.0 | 4.0 | — |
| Water phase | | | | | | |
| Colorant | Furnace carbon black | — | — | — | — | 4.0 |
| Water | Deionized water | 60.0 | 60.0 | 55.0 | 63.0 | 58.0 |
| Dispersant | Polyvinyl pyrrolidone | — | — | — | — | 2.0 |
| Wetting agent | Ethylene glycol | 10.0 | 10.0 | 10.0 | 12.0 | 10.0 |

| Composition of W/O type emulsion ink | | Comparative Example | | | | | |
|---|---|---|---|---|---|---|---|
| (parts by weight) | | 1 | 2 | 3 | 4 | 5 | 6 |
| Oil phase | | | | | | | |
| volatile solvent | (refer to Table 1) | 5.0 | 6.0 | 6.0 | — | 28.0 | 4.0 |
| Non-volatile solvent | Motor oil No. 40 | 10.0 | 10.0 | 11.0 | 17.0 | 4.0 | 17.0 |
| Emulsifier | Sorbitan monooleate | 2.0 | 2.0 | 2.0 | 2.0 | 2.0 | 2.0 |
| Resin | Alkyd resin | 9.0 | 8.0 | 7.0 | 7.0 | 7.0 | — |
| Colorant | Furnace carbon black | 4.0 | 4.0 | 4.0 | 4.0 | 4.0 | — |
| Water phase | | | | | | | |
| Colorant | Furnace carbon black | — | — | — | — | — | 4.0 |
| Water | Deionized water | 60.0 | 60.0 | 60.0 | 60.0 | 45.0 | 61.0 |
| Dispersant | Polyvinyl pyrrolidone | — | — | — | — | — | 2.0 |
| Wetting agent | Ethylene glycol | 10.0 | 10.0 | 10.0 | 10.0 | 10.0 | 10.0 |

TABLE 3

| | Example | | | | |
|---|---|---|---|---|---|
| | 1 | 2 | 3 | 4 | 5 |
| Before emulsion ink was left | | | | | |
| Print concentration | 1.06 | 1.12 | 1.15 | 1.01 | 1.25 |
| Offset | o | o | o | o | o |
| Bleeding | o | o | o | o | o |
| Smell of printed matters | o | o | o | o | o |
| After emulsion ink was left | | | | | |
| Print concentration | 1.12 | 1.18 | 1.18 | 1.03 | 1.31 |
| Offset | o | o | o | o | o |
| Bleeding | o | o | o | o | o |
| Number of lost paper sheets | 15 | 20 | 20 | 25 | 10 |
| Value of spread-o-meter (diameter after 1 minute · 25° C. | 31.0 | 31.5 | 33.0 | 30.0 | 31.5 |

| | Comparative Example | | | | | |
|---|---|---|---|---|---|---|
| | 1 | 2 | 3 | 4 | 5 | 6 |
| Before emulsion ink was left | | | | | | |
| Print concentration | 1.18 | 1.14 | 0.75 | 0.70 | 1.40 | 1.28 |
| Offset | o | o | o | o | x | o |
| Bleeding | o | o | o | o | x | o |
| Smell of printed matters | o | x | x | o | o | o |
| After emulsion ink was left | | | | | | |
| Print concentration | 0.81 | 0.79 | 0.85 | 1.02 | 1.45 | 0.95 |
| Offset | x | x | o | x | x | o |
| Bleeding | x | x | o | x | x | o |
| Number of lost paper sheets | 120 | 130 | 20 | 30 | 30 | 100 |
| Value of spread-o-meter (diameter after 1 minute · 25° C.) | 33.0 | 32.5 | 26.0 | 25.5 | 39.0 | 32.0 |

What is claimed is:

1. A water-in-oil stencil printing emulsion ink containing in an oil phase 1 to 50% by weight, based on the weight of a water phase, of a volatile solvent having a distillation starting temperature of 275° C. or higher and having a viscosity of 10 mm²/s·40° C. or less, and having a weight ratio of the oil phase/water phase of 20 to 50/80 to 50.

2. The stencil printing emulsion ink according to claim 1 wherein the content of an aromatic component in the volatile solvent is 1% by weight or less.

3. The stencil printing emulsion ink according to claim 1 wherein the emulsion ink has a viscosity of 27 to 38 mm in terms of spread-o-meter value at 25° C.

4. The stencil printing emulsion ink according to claim 2 wherein the emulsion ink has a viscosity of 27 to 38 mm terms of spread-o-meter value (diameter after 1 minute) at 25° C.

* * * * *